US012285370B2

(12) United States Patent
Prada Winkler

(10) Patent No.: US 12,285,370 B2
(45) Date of Patent: Apr. 29, 2025

(54) LOWER LIMB TRACTOR AND POSITIONER FOR HIP ARTHROSCOPY AND OSTEOSYNTHESIS SURGERY

(71) Applicant: Carlos Prada Winkler, Medellin (CO)

(72) Inventor: Carlos Prada Winkler, Medellin (CO)

( * ) Notice: Subject to any disclaimer, the term of this patent is extended or adjusted under 35 U.S.C. 154(b) by 678 days.

(21) Appl. No.: 17/299,572

(22) PCT Filed: Sep. 26, 2019

(86) PCT No.: PCT/IB2019/058198
§ 371 (c)(1),
(2) Date: Jun. 3, 2021

(87) PCT Pub. No.: WO2020/144500
PCT Pub. Date: Jul. 16, 2020

(65) Prior Publication Data

US 2022/0031546 A1 Feb. 3, 2022

(30) Foreign Application Priority Data

Jan. 9, 2019 (CO) ........................ NC2019/0000131

(51) Int. Cl.
*A61G 13/00* (2006.01)
*A61G 13/02* (2006.01)
*A61G 13/12* (2006.01)

(52) U.S. Cl.
CPC ..... *A61G 13/1245* (2013.01); *A61G 13/0081* (2016.11); *A61G 13/02* (2013.01)

(58) Field of Classification Search
CPC ............ A61G 13/1245; A61G 13/1205; A61G 13/123; A61G 13/125; A61G 13/0063;
(Continued)

(56) References Cited

U.S. PATENT DOCUMENTS 8,256,047 B2 * 9/2012 Klemm .................. A47C 16/00 128/845
8,683,631 B2 * 4/2014 Bellows ............. A61G 13/1245 5/624

(Continued)

FOREIGN PATENT DOCUMENTS

WO 2007080454 A2 7/2007
WO 2008150731 A1 12/2008

OTHER PUBLICATIONS

"Ortopedia y Rehabilitación, Soluciones" Web page <http://tecnologiaacrobatmts.blogspot.com/2016/07/soluciones-tecnologicas-1.html>, 8 pages, Jul. 17, 2016.

*Primary Examiner* — Adam Baker
(74) *Attorney, Agent, or Firm* — Patenting Consulting Group; Roberto J Rios

(57) ABSTRACT

The present invention belongs to the field of means of transport, personal means of transport or arrangements specially adapted for the sick or the disabled; chairs or operating tables; dentist chairs; burial devices specifically to the operating tables and their accessories, consisting of a sacral support that is anchored to the operating table with two handles with two traction arms that are installed on the shafts of the sacral support and then the suitable perineal support is placed either for hip or femur osteosynthesis surgery or arthroscopy, with a lateralizing bar that allows using the image intensifier to the full extent of the limb without interference.

6 Claims, 6 Drawing Sheets

(58) Field of Classification Search
CPC .... A61G 13/0081; A61G 7/1082–1098; A61H 1/0218; A61H 1/0222; A61H 1/0237; A61H 1/024; A61H 1/0244; A61H 1/0266–0296; A61H 2001/0248; A61H 2001/0251; A61F 5/04; A61F 5/042; A61F 5/048; A61F 5/3761
See application file for complete search history.

(56) References Cited

U.S. PATENT DOCUMENTS

| | | | | |
|---|---|---|---|---|
| RE46,032 | E * | 6/2016 | Torrie | A61G 13/0036 |
| 2007/0161935 | A1 * | 7/2007 | Torrie | A61G 13/12 602/32 |
| 2013/0199541 | A1 * | 8/2013 | Sluss | A61G 7/015 128/845 |
| 2013/0206149 | A1 * | 8/2013 | Spendley | A61G 13/1285 128/845 |
| 2014/0068864 | A1 * | 3/2014 | Clark | A61G 13/00 5/621 |
| 2016/0287237 | A1 | 10/2016 | Demayo et al. | |
| 2018/0140493 | A1 | 5/2018 | Shandas et al. | |
| 2018/0200131 | A1 | 7/2018 | Aboujaoude et al. | |
| 2018/0280222 | A1 * | 10/2018 | Pichette | A61G 13/0081 |
| 2020/0038275 | A1 * | 2/2020 | Romano | A61G 13/1235 |

* cited by examiner

LOWER LIMB TRACTOR AND POSITIONER FOR HIP ARTHROSCOPY AND OSTEOSYNTHESIS SURGERY

TECHNOLOGICAL SECTOR

The present invention belongs to the field of means of transport, personal means of transport or arrangements specially adapted for the sick or the disabled; chairs or operating tables; dentist chairs; burial devices specifically to the operating tables and their accessories, consisting of a sacral support that is anchored to the operating table with two handles with two traction arms that are installed on the shafts of the sacral support and then the suitable perineal support is placed either for hip or femur osteosynthesis surgery or arthroscopy, with a lateralizing bar that allows using the image intensifier to the full extent of the limb without interference.

STATE OF THE ART

Patent application No. US2018140493 published on May 24, 2018 is known in the state of the art, which describes a distraction system for use with a surgical table having a table portion and a base portion. The distraction system includes a pair of swivel arms that can be connected to the base portion at a portion of the proximal end of each arm. A pair of telescopically adjustable support posts extend upward from the corresponding arms. Each arm swivels around a vertically oriented shaft to provide hip adduction and leg abduction for a patient. Each support post extends from a linear bearing anchored to the corresponding one of the pair of arms to move along the arm to facilitate application of traction to a patient's leg. The system may also include a table extension attachable to the table portion and a friction pad mounted on the table extension.

There is also the patent application No. US20180200131 published on Jul. 19, 2018, which provides a device or accessory to position, adjust and stretch a patient's limb for surgical procedures in which alignment is critical and minor adjustments may be required. The device prevents the patient's limb from moving after the physician has selected the precise position for the chosen procedure, using a combination of an articulating and rotating frame or support plates and support rings attached to the surgical positioning system of the limb that acts as a limb splint that is firmly attached to the surgical table. The support plates are attached to the patient by a series of adjustable braces that prevent the limb from moving independently of the support plate. A locking gear and rack configuration and a large number of adjustable locking pivot points positioned along and within the outer/inner proximal tube and the outer/inner distal tube to extend or rotate various parts of the limb.

Also, there is the patent application No. US20160287237 published on Oct. 6 2016, which describes an elevation apparatus, system and method for elevating the patient's limb when using a manual distractor unit is mounted upon a support frame attached to an operating table side rail. A foot brace is attached to the extension apparatus and to the patient's ankle with a. patient's knee support pad, extending from the distractor unit, is positioned under the patient's knee to provide traction to the patient's ankle, which is secured to the support frame. The extension apparatus may be formed with a plurality of attachment points for the foot brace so as to provide improved access to the ankle area with advantages of allowing additional types of procedures a surgeon may perform on the patient and/or the ability of the surgeon to access the ankle area and lower leg.

In the state of the art there is patent application No. WO2007080454 published on Nov. 30, 2007, which describes an apparatus that includes a distractor assembly adapted to couple to a leg and capable of providing a distraction load on the leg in both supine and lateral positions of the leg. Embodiments of this aspect may include one or more of the following features. The distractor assembly includes a joint, for example, a ball joint or universal joint, configured to couple the distractor assembly to a surgical table, The joint is lockable and the mechanism for locking the joint is located remote from the joint. The apparatus is configured such that with a patient positioned on the surgical table and coupled to the distractor, the joint is offset from the patient's hip joint. The apparatus is entirely supported by a surgical table. In an illustrated embodiment, the distractor assembly includes a distractor member and a leg mount, for example, a foot mount, coupled to the distractor member for movement relative to the distractor member by both sliding and threaded engagement. The leg mount is coupled to the distractor member by a ball joint. The apparatus includes a foot holder mountable to the distractor assembly and including a support bar that supports the lower leg in the lateral and supine positions. The apparatus further includes a support configured to be fastened to a surgical table, and the distractor assembly includes a joint, for example, a ball joint or a universal joint, coupling the assembly to the support. The support includes two mounts for coupling to the joint and the distractor assembly is arranged for use with a patient in a supine position with the joint coupled to a first of the mounts for surgery on a right leg, or to a second of the mounts for surgery on the left leg.

There is also the patent application No. WO2008150731 published on May 29, 2007, which describes an apparatus that includes a distraction assembly adapted to be attached to a leg and capable of providing a distraction load on the leg both in the supine and lateral positions. of the leg. Embodiments of this aspect may include one or more of the following features. The distractor assembly includes a joint, eg, a ball or universal joint, configured to couple the distractor assembly to a surgical table. The joint is lockable and the mechanism for locking the joint is located remote from the joint. The apparatus is configured such that, with a patient positioned on the surgical table and coupled to the distractor, the joint is displaced from the patient's hip joint. The apparatus is fully supported by a surgical table. In an illustrated embodiment, the distractor assembly includes a distractor member and a leg support, eg, a foot support, coupled to the distractor member for movement relative to the distractor member by threaded sliding engagement. The leg support is coupled to the distractor member by a ball joint. The apparatus includes a foot support mountable to the distractor assembly and includes a support bar that supports the lower leg in the lateral and supine positions. The apparatus further includes a bracket configured to be attached to a surgical table, and the distraction assembly includes a joint, eg, a ball joint or universal joint, that couples the assembly to the support.

Compared to what is known in the state of the art, the invention provides a new solution with a low-profile sacral support that does not exist in the state of the art, for the passage of other equipment without interfering with the surgical procedure as if it happens with the previous ones. This low-profile sacral support, without a foam pad, measures between 95 mm to 105 mm in height in its profile, unlike the existing supports in other equipment that are more than 250 mm in height in its profile, which makes it difficult to use the image intensifier.

Furthermore, the new invention has two moving shafts and a spherical sweep angle of up to 135° for the traction arms to which they are attached; a perineal support covered with a crescent-shaped foam with a lucid radius post that has inside transverse wings that receive the pressure of the traction in the region of the adductors without putting pressure on the genitalia as a new solution that moves away from the known perineal supports; and boots with a lateralizing bar which function is to move the lower limb away from the traction arm to have a better view of the limb with the image intensifier without interference.

DESCRIPTION OF THE INVENTION

Currently the conventional traction tables for hip and femur surgery are very cumbersome and are designed for the treatment of fractures only and work with difficulty to give the positions that the doctor wants in the hip and femur arthroscopic surgery.

The invention is a device that allows the treatment of fractures and hip and femur arthroscopic surgery, giving the treating physician the possibility of achieving the movements and positions he wants very easily and quickly. The space that the equipment occupies is between 70 cm×60 cm, which compared to other equipment adapts to any surgical table and is easily moved from one operating room to another.

With the invention it is allowed to continue using the existing surgical tables in the surgical unit and the use of other parallel equipment in the surgery is facilitated without interfering with them, as is the case with the use of the image intensifier.

The equipment is transported on a two-wheeled trolley with easy to maneuver and operated by a single person.

Figure 1:
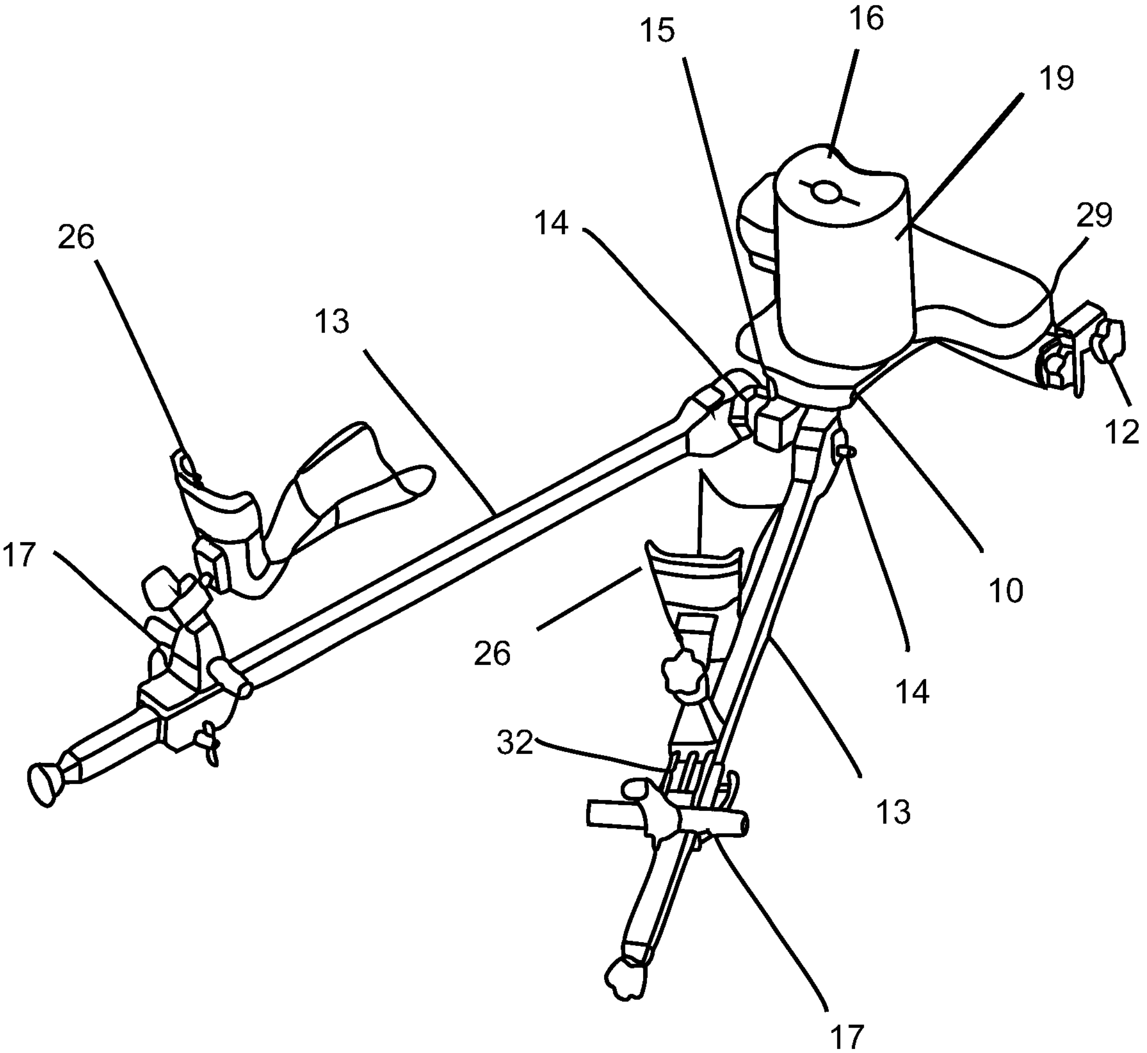
FIG. 1: Shows a general image of the lower limb traction and positioning equipment for hip arthroscopy and osteosynthesis surgery coupled to traction arms to be adjusted to a known surgery table.
Figure 2:
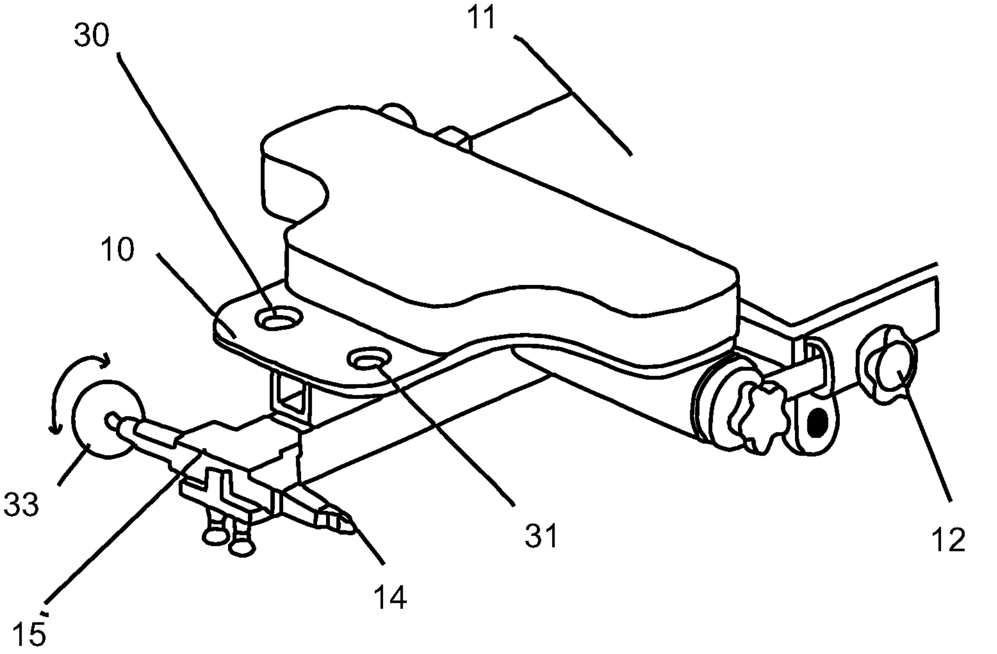
FIG. 2: Shows a perspective view of the sacral support of the lower limb traction and positioning equipment mounted on the surgery table with the braces.
Figure 3:
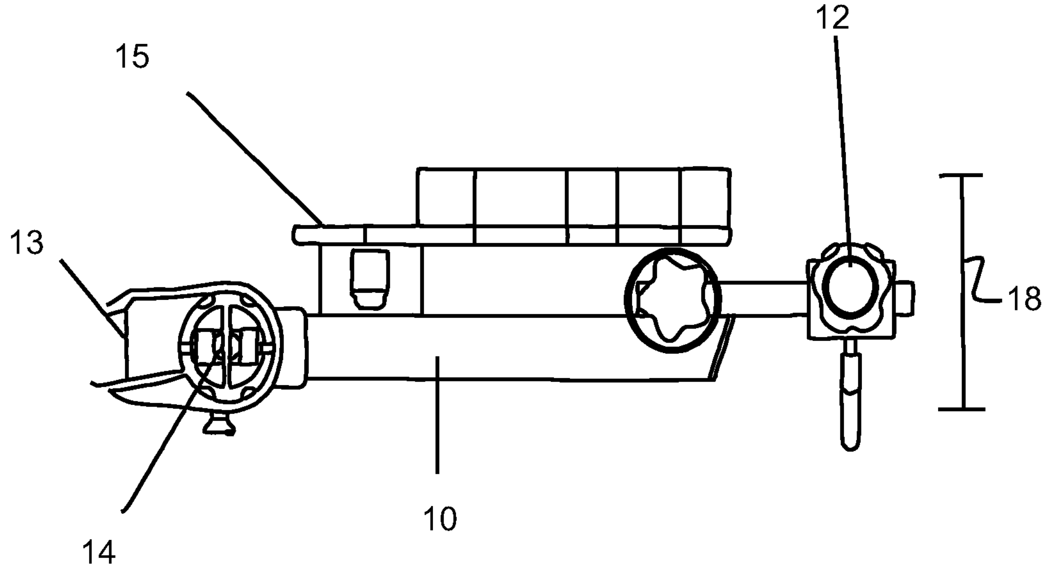
FIG. 3: Shows a side view of the sacral support of the lower limb traction and positioning equipment.
Figure 4:
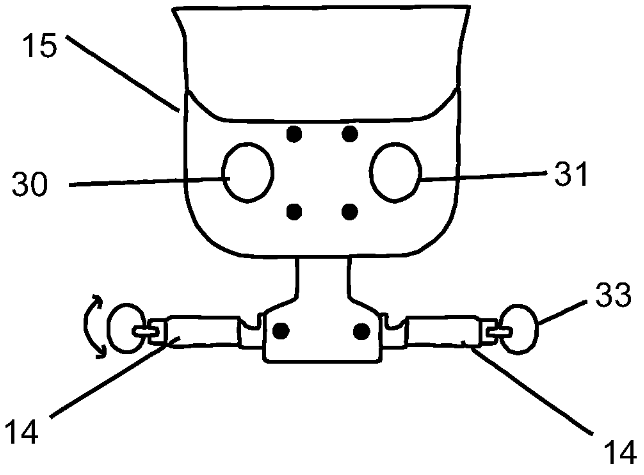
FIG. 4: Shows the distal end of the sacral support with its support shafts at 0°.
Figure 5:
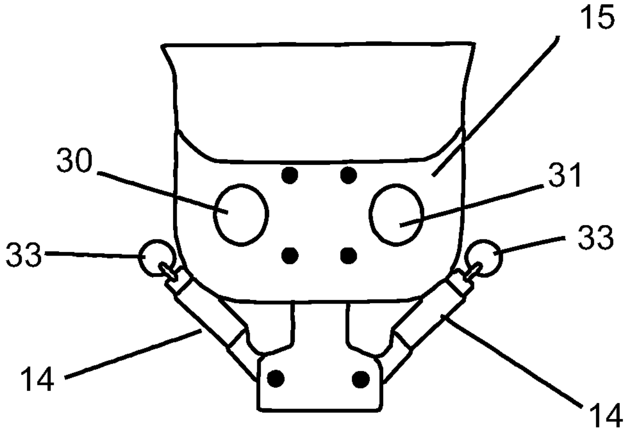
FIG. 5: Shows the distal end of the sacral support with its support shafts at 45°.
Figure 6:
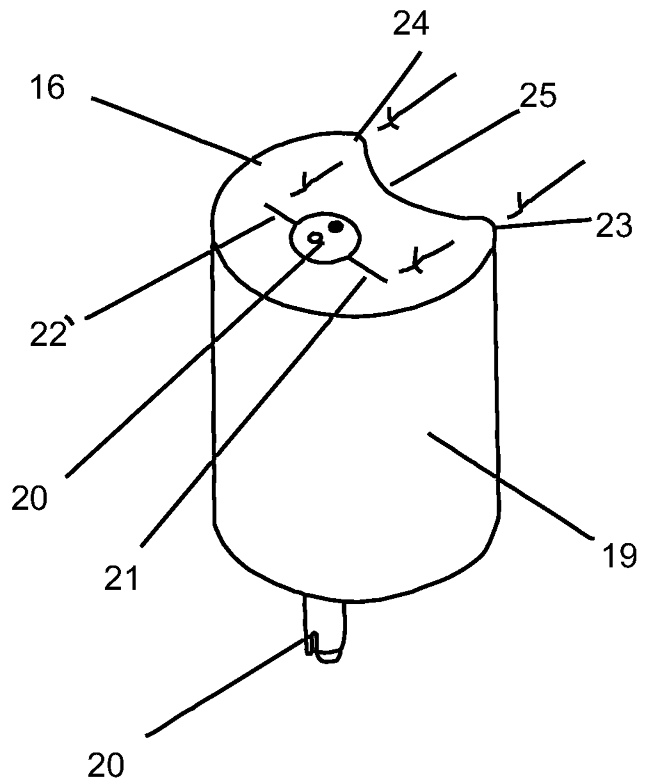
FIG. 6: Shows the perineal post with protective foam.
Figure 7:
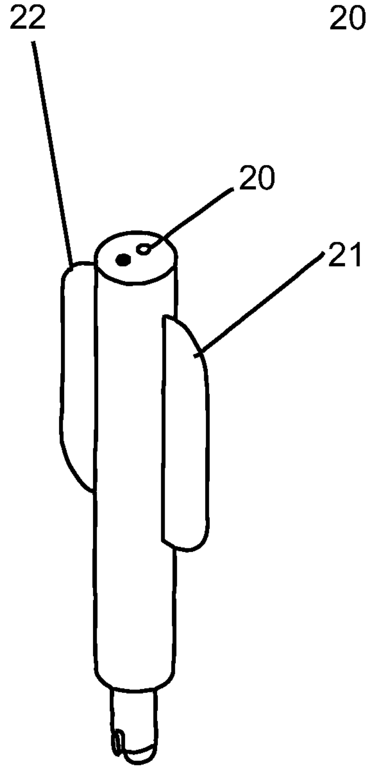
FIG. 7: Shows the perineal post without protective foam.
Figure 8:
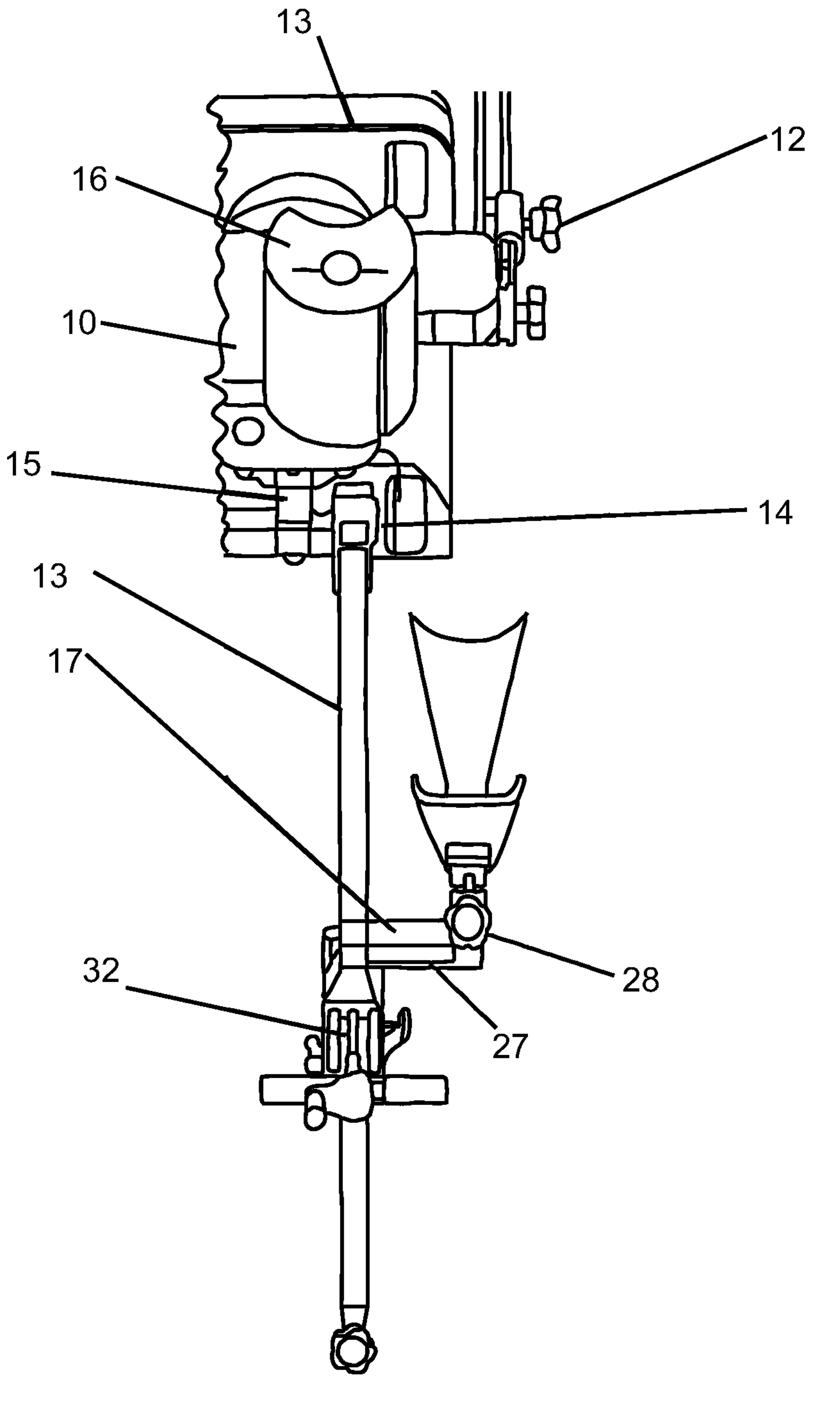
FIG. 8: Shows a traction arm with the lateralizing bar for adjusting interchangeable boots
Figure 9:
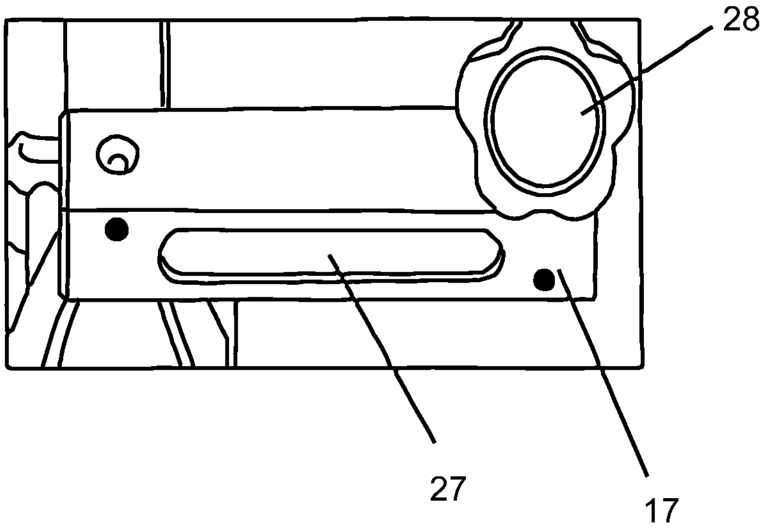
FIG. 9: Shows in detail the lateralizing bar for adjustment with lateral displacement of interchangeable boots.
Figure 10:
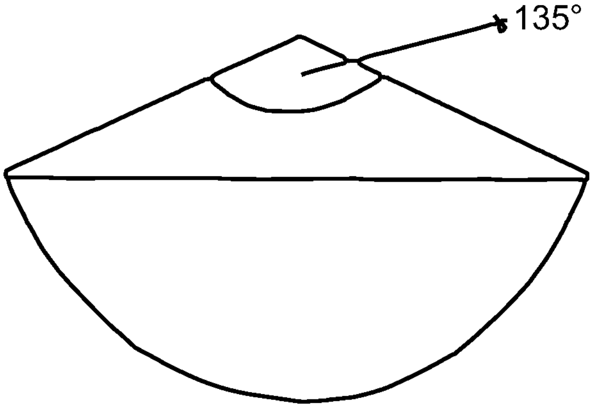
FIG. 10: Shows the formation of a 135° angle with the sum of the 90° angles of the traditional arms plus the additional 45° angles of the support shafts of the distal end of the sacral support.

The sacral support equipment of the lower limb traction and positioning equipment consists of a sacral support (10) that is anchored to the surgery table (11) with two handles (12). It has two traction arms (13) that are installed on the support shafts (14) of the distal end (15) of the sacral support (10).

When the traction arms (13) are installed on the support shafts (14), the appropriate perineal support is placed, either for hip or femur osteosynthesis surgery or arthroscopy. It also has a lateralizing bar (17) that allows using the image intensifier to the full extent of the limb without interference.

The equipment called lower limb tractor and positioner for hip osteosynthesis surgery and arthroscopy provides four solutions that improve the versatility, functionality and utility of the other existing equipment. The sacral support (10) is low profile with a height measurement (18) between 95 mm to 105 mm, allowing another surgical equipment to move through the lower part measured with the height of the surgical table to which it is adjusted; such as the image intensifier, without the displacement of the other surgical equipment interfering with the surgical procedure being performed.

It can be anchored to any surgical table to turn it into an orthopedic traction table with its two handles (12).

The sacral support (10) has in its most distal part of the distal end (15), two movable support shafts (14), where the traction arms (13) are installed coupled to a spherical termination (33) of each one of the two support shafts (14), which allow the movement of the traction arms (13) up to 135°; where these support shafts (14) are mobile in the horizontal direction and add 45° more of movement to the conventional arms that have 90° of movement in the horizontal plane, for a total of 135° of movement in a spherical sweep of the traction arms (13).

The lower limb tractor and positioner for hip osteosynthesis surgery and arthroscopy has two types of perineal support, a conventional radiolucent perineal support and another crescent perineal support (16) with a crescent-shaped foam coating (19) with a radiolucent post (20) that has inside a right transverse wing (22) and a left transverse wing (21) that receives the pressure of the traction in the right region (24) and in the left region (23) of the adductors without putting pressure on the genitalia through the crescent-shaped cavity (25).

On the other hand, the boots (26) for fixing the feet of the lower limb tractor and positioner for hip osteosynthesis surgery and arthroscopy are interchangeable. This feature allows placing a lateralizing bar (17) which function is to move the lower limb away from the traction arm (13) in order to have a better view of the limb with the image intensifier without interference. This feature with a lateralizing bar (17), rail (27) and adjustment nut (28) also allows changing the position and size of the boots (26), such as placing a smaller boot (26) to make traction of the lower limb in children and adolescents.

The hip positioner and tractor equipment are adapted as an accessory to a conventional surgery table (11) as follows:

1. A brace (12) for fixation with the side rails (29) is placed on each side of the surgical table (11).

2. The sacral support (10) is coupled to the braces (12) by means of two small rails (29) that are on the sides of the sacral support (10), thus remaining fixed to the surgery table (11).

3. The perineal support is placed in the right hole (30) or in the left hole (31) that has the distal end (15) of the sacral support (10). The hole to be chosen depends on the side on which the surgery is to be performed, that is, if the right side of the patient is to be operated, the support must be placed in the hole (30) that corresponds to the right side of the patient.

Depending on the type of surgery, the appropriate perineal support will be placed, the conventional cylindrical perineal support for conventional osteosynthesis surgeries or the crescent-shaped perineal support (16) that has a crescent shape for arthroscopic surgery.

4. The next step is the placement of the traction arms (13), one of the traction arms (13) has an endless screw (32) and goes on the side where the surgery is performed, the other arm (13) is placed on the opposite side.

The patient can be moved and mounted on the sacral support (10) and the feet are attached to the boots (26) of the traction arms (13).

Preferred Embodiments

Braces (12) are attached to rails (29) known as a means of attaching accessories to surgical beds.

The sacral support (10) with a profile between 95mm and 105mm is adjusted with its braces (12) to the surgical bed (11), allowing an image intensifier to be easily placed without interfering with the accessory; where the sacral support (10) at its distal end has a support shaft (14) on each side and a traction arm (13) is placed on each of the support shafts (14).

These shafts have the particularity of being able to scale at 45° individually with respect to the longitudinal shaft of the sacral support (10). The escalation of the support shafts (14) allows the movement of the arms in the horizontal plane to reach 135°, that is to say that the traction arms (13) can have a movement range of 135° of a sphere.

The perineal support is placed in the corresponding hole on the side of the surgery. The equipment comes with two perineal supports, a simple cylindrical support used in conventional hip and femur osteosynthesis surgeries and a crescent-shaped perineal support (16) for arthroscopic hip surgery with a crescent shape with a radiolucent post (20) made of carbon fiber with transverse wings (22), (21) that allows the hip to be easily dislocated and prevents traction from being made without compressing the genitalia, allowing the counter-traction to be made on the thighs in contact with the regions (23) and (24) to avoid compression of the pudendal nerve.

In this case, the surgery will be performed on the left side, the endless screw arm (32) is on the left side, as well as the crescent-shaped perineal support (16). The arms have a universal joint that allows them to be moved in the horizontal plane 90° and when the support shafts (14) to which they are attached are scaled, the movement is extended to 135° of spherical sweep.

The lateralizing bar (17) is attached by removing the foot support boot (26) and the lateralizing bar (17) is placed, in this lateralizing bar (17) the boot (26) is fixed, leaving the lower limb free of interference to the use of the image intensifier.

The crescent-shaped perineal support (16) has two parts, a first part made up of a support post (20) which for the case is made up of carbon fiber and a second part made up of a polyurethane foam coating (19) to cushion traction pressure. The crescent-shaped perineal support (16) makes that the support is on the adductor muscles without pressing the perineum when a traction of 25 kg of force is made, avoiding injuring the genitalia and the pudendal nerve.

The invention claimed is:

1. A lower limb tractor and positioner for hip osteosynthesis surgery and arthroscopy comprising:

a low profile sacral support (10) comprising two support shafts (14), each having one end rotatably fixed to said low profile sacral support (10) and another end including a swiveling ball termination (33), wherein said two support shafts (14) rotate horizontally in relation to said low profile sacral support (10);

two traction arms (13), each removably installed on respective support shafts (14) when coupled to said swiveling ball end (33) providing a total of 135° of movement in a spherical sweep of the traction arms (13);

a crescent-shaped perineal support (16) with a crescent-shaped polyurethane foam coating (19) with a radiolucent support post (20) that has inside a right transverse wing (22) and a left transverse wing (21) that receives pressure of the traction in a right region (24) and in a left region (23) of the adductors without putting pressure on the genitalia by a crescent-shaped hole (25); and a lateralizing bar (17) configured to move the lower limb away from the traction arm (13) to have a view of the limb with an image intensifier without interference, where the lateralizing bar (17) has a rail (27) and an adjustment nut (28) to exchange the position and size of boots (26) for fixing the equipment feet.

2. The lower limb tractor and positioner for hip osteosynthesis surgery and arthroscopy according to claim 1, wherein the sacral support (10) has two braces (12) with rails (29) as a means of attaching accessories to surgical beds.

3. The lower limb tractor and positioner for hip osteosynthesis surgery arthroscopy according to claim 1, wherein the crescent-shaped perineal support (16) has two parts, a first part formed by the radiolucent support post (20) made up of carbon fiber and a second part made up of the crescent-shaped polyurethane foam coating (19) to cushion the pressure of the traction; where the crescent-shaped perineal support (16) ensures that the support is in the adductor muscles without pressing the perineum when a traction of 25 kg of force is applied, avoiding injuring the genitalia and the pudendal nerve.

4. The lower limb tractor and positioner for hip osteosynthesis surgery and arthroscopy according to claim 1, wherein said low profile sacral support (10) has a height between 95 mm to 105 mm.

5. The lower limb tractor and positioner for hip osteosynthesis surgery and arthroscopy according to claim 1, wherein said two movable support shafts (14) are provided on a distal end (15) of said low profile sacral support (10).

6. The lower limb tractor and positioner for hip osteosynthesis surgery and arthroscopy according to claim 1, wherein said low profile sacral support (10) has a crescent shape.

* * * * *